United States Patent Office 3,751,460
Patented Aug. 7, 1973

3,751,460
PROCESS FOR PREPARING ISOMERIC CYCLIC 5-MEMBERED UNSATURATED PHOSPHINE DIHALIDES
Reinhard Schliebs, Cologne, and Gerhard Jonas, Leverkusen, Germany, assignors to Bayer Aktiengesellschaft, Leverkusen, Germany
No Drawing. Filed July 19, 1971, Ser. No. 164,039
Claims priority, application Germany, July 21, 1970, P 20 36 173.3
Int. Cl. C07d 105/02
U.S. Cl. 260—543 P         10 Claims

ABSTRACT OF THE DISCLOSURE

Isomeric cyclic 5-membered unsaturated phosphine dihalides are prepared by reacting organo-phosphine dihalides with dienes in an oxyhalide of pentavalent phosphorus as a solvent.

---

This invention relates to a process for the preparation of isomeric cyclic 5-membered unsaturated phosphine dihalides, under oxyhalides of pentavalent phosphorus (having four groups bonded to the phosphorus) as solvent.

It is known that cyclic 5-membered unsaturated phosphine dihalides can be obtained by reacting halides of trivalent phosphorus with dienes.

The reaction is generally carried out by mixing the phosphorus halides with the diene and leaving the mixture to stand for some time (several days or up to several months) at temperatures varying from room temperature to about 60° C. The reaction is only insignificantly accelerated by increasing the temperature. When the diene used is isoprene and the organic phosphorus dihalide used is ethyl dichlorophosphine, the conversion after 11 days at about 60° C. is only about 59%.

Shorter reaction times can be achieved only when using bromides of trivalent phosphorus and very active dienes.

Short reaction times have not so far been obtained in the more practical important cases, which involve the readily accessible lower alkylphosphorus dichlorides and butadiene, isoprene, 2-chlorobutadiene and 2,3-dichlorobutadiene. In order to obtain at least moderate percentage conversions, it has been necessary to leave the reaction mixture to stand for several weeks or even for up to several months.

These long reaction times constitute a serious obstacle to the practical application of this class of compounds.

Another disadvantage of the process previously used is the risk of the reactants undergoing spontaneous heating when added together, thus leading to the formation of unwanted polymeric products. This phenomenon generally occurs e.g. when using isoprene and methyl dichlorophosphine. Even the addition of the known polymerisation inhibitors cannot prevent this.

Since cyclic 5-membered unsaturated phosphine dihalides are used inter alia for the production of the corresponding 1-oxo-1-organylphospholines, it has been proposed to accelerate the formation of the last mentioned compounds by carrying out the reaction between organo-dihalogen phosphines and dienes in the presence of acetic anhydride (U.S.S.R. Pat. No. 186,465).

Experiments have shown, however, that organo-dihalogen phosphines rapidly react with acetic anhydride to form by-products, so that the process is not suitable for use in practice.

Attempts have also been made to carry out the reaction between the organo-dihalogen phosphines and dienes in solvents which are compatible both with the alkyl-dihalogen phosphines and with the dienes as well as with the end products of the reaction and which are capable of dissolving at least the starting materials. Such solvents are e.g. toluene or aliphatic hydrocarbons. However, it has been found that these solvents severely slow down the reaction or may even bring it to a complete standstill.

In principle, any compounds which are inert to the three reactants, i.e. to organo-dihalogen phosphine, diene and cyclic 5-membered phosphine dichlorides, may be used as solvents. Solvents such as alcohols, nitriles, amines, sulphur dioxide, thionyl chloride, etc. are therefore unsuitable for this purpose because they react at least with one of the reactants. Solvents such as toluene, methylene chloride, chloroform and others which are inert under the conditions of the reaction are suitable in principle. If the reaction is carried out with such solvents at temperatures of e.g. 60° C., the reaction is found to be accelerated but very large quantities of polymeric material are obtained. When isolating the phosphine oxide from the reaction mixture, approximately 60% of polymeric material, based on the end product, are obtained in addition to the required end product.

SUMMARY

It has now surprisingly been found that isomeric cyclic 5-membered unsaturated phosphine dihalides are obtained in excellent yields when organo-phosphorus dihalides are reacted with dienes in the presence of the usual polymerisation inhibitors in an oxyhalide of pentavalent phosphorus (the phosphorus being bonded to four groups) as solvent in the temperature range of 20 to 90° C.

In a preferred embodiment of the process of the invention, organo-phosphorus dihalides of the formula:

$$R—P(Hal)_2$$

in which

R represents substituted or unsubstituted aliphatic, cycloaliphatic, aromatic or araliphatic radical, and
Hal represents a chlorine or bromine atom, are reacted with a diene of the formula:

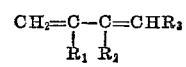

wherein the radicals $R_1$, $R_2$ and $R_3$, which may be the same or different, represent hydrogen or chlorine atoms, alkyl radicals, containing 1 to 4 carbon atoms, or phenyl groups, in the presence of the usual polymerisation inhibitors in an oxyhalide of pentavalent phosphorus as solvent at temperatures of 20 to 90° C.

DESCRIPTION

The aliphatic radicals for R may be alkyl radicals containing 1 to 18, and preferably 1 to 4, carbon atoms or, of course, any cycloaliphatic radicals containing 5 to 12, and preferably 5, 6 or 7, carbon atoms in the ring system. These aliphatic radicals may be substituted by halogen atoms (preferably fluorine, chlorine or bromine).

The unsubstituted or substituted aromatic radicals for R may be naphthyl radicals or, preferably, phenyl radicals. The araliphatic radicals (R) contain 1 to 4, and preferably 1 or 2, carbon atoms in the aliphatic chain and the aromatic radical in them is preferably the phenyl radical and the substituents of the aromatic or araliphatic radicals may be halogens (preferably fluorine, chlorine or bromine) and/or lower alkyl radicals containing 1 to 4 carbon atoms. The cycloaliphatic radical may also be substituted with such lower alkyl radicals. The dienes used for the process according to the invention are preferably those in which the radicals $R_1$, $R_2$ and $R_3$ represent hydrogen atoms or hydrogen atoms and methyl groups, whereby also one of the radicals $R_1$ or $R_2$ may stand for chlorine and the other as well as $R_3$ stand for hydrogen.

The solvents used in the present invention are functionally tetravalent phosphorus compounds having four substituents bonded to the phosphorus (V) atom and contain oxygen and one or more halides and are thus referred to generally as "oxy halides." Preferred phosphorus compounds are phosphorus oxyhalides such as phosphorus oxychloride ($POCl_3$) and phosphorus oxybromide ($POBr_3$); alkyl phosphonic acid dihalides preferably those containing lower alkyl having one to four carbon atoms such as a lower alkyl phosphonic acid dichloride or dibromide, for example, methane-phosphonic acid dichloride; and alkyl phosphinic acid halides, preferably those containing lower hydrocarbon radicals with 1 to 4 carbon atoms such as a lower alkyl phosphinic acid chloride or bromide, for example, dimethyl phosphinic acid chloride, $(CH_3)_2POCl$.

The process according to the invention can be carried out over a relatively wide temperature range. The temperature range employed is generally 20 to 90° C., preferably 40 to 80° C., but the reactivity of the reactants would, of course, also be taken into account.

The reaction time also depends on the reactivity of the components. It may vary between several hours and several days. Thus, for example, butadiene and methyldichlorophosphine have reacted to an extent of about 90% after 24 to 48 hours. A similar reaction carried out by the known process takes about 4 weeks.

The process of the invention may be carried out at normal pressure or elevated pressure. Elevated pressure may be necessary if dienes which are gaseous at room temperature are employed, e.g. butadiene. The pressure established in the reaction vessel is equal to the vapour pressure of the components at the prevailing temperature.

The ratio of solvent to the sum of reactants may be varied within a relatively wide range. Although ratios (in parts by weight) of 5:1 (solvent:sum of reactants) provide high yields, the recovery of solvent then required entails considerable expenditure. On the other hand, ratios of 1:1 (solvent:sum of reactants), while also providing satisfactory results, are not very suitable owing to the risk of a spontaneous reaction and the problem which this entails of having to remove heat. Suitable conditions with regard to the said factors are obtained when the ratio of solvent to sum of reactants is in the region of about 1.5 to about 3:1.

It is known that it is advantageous to add polymerisation inhibitors in the reaction between organo-dihalogen phosphines and dienes (Houben-Weyl, Methoden d. Org. Chemie, volume XIV, 1), which is incorporated herein by reference. For the process described here, it is also advantageous to add such inhibitors, e.g. copper stearate, phenothiazines or tertiary butyl pyrocatechol, in quantities of about 0.1 to 1.0% by weight (based on the sum of organo-dihalogen phosphine and diene).

The preparation of cyclic 5-membered phosphine dihalides may be carried out either continuously or in batches but, in view of the relatively long reaction times normally required, it is generally advisable to employ the batch method.

The reactants may be added to the solvent either simultaneously or successively. If the batches are not too large (several kg. of reaction mixture) and the diene is not too active, e.g. butadiene, the reactants may conveniently all be heated together in the phosphorus oxyhalide. Where more active dienes are used (isoprene) it may be advisable to add the diene to the given mixture of phosphorus oxyhalide and organo-dihalogen phosphine. Alternatively, the organo-dihalogen phosphine may be added to a mixture of phosphorus oxyhalide and diene.

In the reaction, the two reactants, organo-dihalogen phosphine and diene, may be used in a molar ratio of 1:1. It will generally be advantageous to use one of the two components in excess. Which of the components is used in excess will generally depend on whether the diene or the organo-phosphorus dihalide is more readily accessible, so that the readily accessible dienes (butadiene, isoprene or 2-chlorobutadiene) are used in excess. When the reaction is completed, the solvent and unreacted reactants may be removed by distillation from the solid, non-volatile phosphine dihalide formed. The removal of solvent is best carried out under vacuum at temperatures generally not exceeding the upper limit of the reaction temperature range. A dark, crystalline residue is generally obtained. This may be recovered as such and analysed.

The compounds obtained by the process according to the invention are valuable intermediate products for the preparation of the corresponding oxides or sulphides. Conversion into the above mentioned compounds is carried out in known manner by the addition of water, alcohols, acetic acid or hydrogen sulphide, as described e.g. in U.S. patent specification Nos. 2,663,736; 2,663,737 and 2,663,738.

The following examples are intended to further illustrate the present invention without limiting same.

Example 1 (prior art control)

0.25 mol of methyl-dichlorophosphine (=29 g.), 0.25 mol of butadiene (=14 g.), 0.1 g. of copper stearate and 0.1 g. of tertiary butyl pyrocatechol (TBC) were mixed at —20° C., introduced into a round bottomed flask which could be sealed tightly to withstand pressure, and left to stand at 20 to 25° C. for 7 days. Unreacted methyl-dichlorophosphine and butadiene were then removed under vacuum, the solid crystalline residue (10 g.=23% of theory) was dissolved in 20 ml. of water, the hydrochloric acid was evaporated off at 12 mm. Hg at a sump temperature of up to 100° C., the residue was adjusted to pH 7 with sodium hydroxide solution, and the aqueous solution, which contained sodium chloride, was extracted with 6× 50 ml. of chloroform. 6 g. 1-methyl-1-oxo-phospholine-3 (=20% of theory) could be isolated from the chloroform extract by distillation.

When the above mentioned reaction mixture is diluted with 100 ml. of light petrol or toluene, only 1 to 2 g. of phosphine dihalide are formed after the given reaction time of 7 days at 20° C.

Example 2 (the invention)

200 ml. of phosphorus oxychloride, 0.5 mol of methyl-dichlorophosphine (=58.5 g.) and 0.6 mol of butadiene (20% excess) were added together in a pressure vessel at 10° C. in the presence of 0.3 g. of copper stearate and 0.3 g. of tertiary butyl pyrocatechol and heated to 55° C. for 2 days. After removal of all the readily volatile components by evaporation, the isomeric mixture of compounds of the formulae:

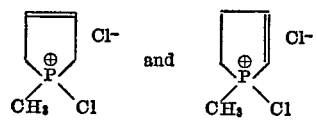

is obtained in quantitative yield.

The phosphine dichloride was converted into the phosphine oxide by the method described in Example 1 to identify the compound, and 42 g. (=72.5% of theory) of 1-oxo-1-methyl-phospholine, B.P. 135° C./12 mm. Hg, were obtained. According to gas chromatographic analysis, 94% of the double bonds of the phosphine oxide produced are in the 2-position and 6% in the 3-position.

When a reaction temperature of 60° C. was employed, 30 g. of phosphine oxide (corresponding to 50% of the theory) were obtained after a reaction time of only 15 hours and 41 g. (72% of the theory) were obtained after 30 hours.

Example 3 (control experiment)

In a manner analogous to Example 2, 450 ml. of chloroform, 273 g. of methyl-dichlorophosphine, 200 g. of butadiene, 1 g. of copper stearate and 1 g. of tertiary butyl pyrocatechol were heated at 60° C. for 55 hours. After removal of the readily volatile components by evaporation, the reaction mixture was worked up as described before to obtain the phosphine oxide, 140 g. (corresponding to 51.8% of the theory) of 1-methyl-1-oxo-phospholine (66.5% symmetrical, 33.5% asymmetrical) being obtained. The polymer residue weighed 90 g. (corresponding to 30% based on the amount of methyl-dichlorophosphine put into the reaction). When chloroform was replaced by methylene chloride, the yield of phosphine oxide obtained as residue was 51%, corresponding to 30% of the theory.

Example 4(a)

In a manner analogous to Example 2, 5 litres of phosphorus oxychloride, 2730 g. of methyldichlorophosphine (23.6 mol), 1550 g. of butadiene (28.7 mol), 3.5 g. of copper stearate and 3.5 g. of tertiary butyl pyrocatechol were introduced into a 15 litre enamel pressure reactor. Water circulated in the heating jacket of the pressure reactor at 50° C. The temperature inside the reactor rose to a maximum of 58° C. in the course of about 24 hours and then dropped to 50° C. in the course of the next 24 hours. The experiment was then terminated. Phosphorus oxychloride was driven off together with unreacted methyl-dichlorophosphine and butadiene. The butadiene was separated from the phosphorus chlorides. 7780 g. of a mixture of phosphorus oxychloride and methyldichlorophosphine containing 3.1% by weight of methyldichlorophosphine were recovered (corresponding to 242 g. of methyldichlorophosphine). To identify the product, the autoclave residue was dissolved in 1.5 litres of water and the resulting aqueous solution was adjusted to pH 7 with sodium hydroxide solution and completely extracted with chloroform. 1850 g., corresponding to 70.6% of the theory, of 1-methyl-1-oxo-phospholine were obtained. 50% of the double bonds of this compound were in the 2-position and 50% in the 3-position. 8.7% of the methyl dichlorophosphine used were recovered in the form of a solution in phosphorus oxychloride while 20.7% of the methyldichlorophosphine used had been converted into polymer products.

Example 4(b)

In a manner analogous to Example 2, 60 litres of phosphorus oxychloride, 35.1 kg. of methyldichlorophosphine, 19.8 kg. of butadiene and 20 g. of distilled tertiary butyl pyrocatechol were introduced into a 200 litre enamel pressure reactor. The mixture was maintained at 54 to 55° C. for 70 hours. The pressure rose to a maximum of 1.8 excess atmospheres.

The reaction product was worked up and identified as in Example 3.

29.5 kg. (approximately 85.5% of the theory) of 1-oxo-1-methyl-phospholine (43% symmetrical, 57% asymmetrical) were obtained.

Example 5 (control experiment)

117 g. of methyldichlorophosphine were mixed with 0.5 g. of copper stearate and 0.5 g. of tertiary butyl pyrocatechol and cooled to −20° C. 80 g. of stabilised isoprene cooled to −25° C. were added to this mixture. The mixture quickly heated up, with boiling, to about 100° C., a white, rubber-like solid being obtained. It was not possible to prevent this reaction by changing the sequence in which the reactants were added, the temperature or the like.

Example 6 (the invention)

0.5 g. of copper stearate and 0.5 g. of tertiary butyl pyrocatechol were added to 234 g. of methyldichlorophosphine in 400 ml. of phosphorus oxychloride, and 150 g. of isoprene were then rapidly added at 0 to −10° C. The temperature of the reaction mixture was then kept at 50° C. for 43 hours. After removal of the volatile components by evaporation, the isomeric mixture of the formulae:

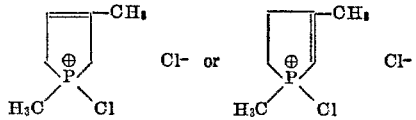

was obtained. On hydrolysis to identify the product, 142 g. (=54.5% of the theory) of 1-oxy-1,3-dimethyl-phospholine were obtained. About 65% of the double bonds were in the 2-position and 35% in the 3-position.

Example 7

3 mols of methyldichlorophosphine were dissolved in 600 ml. of phosphorus oxychloride in the presence of 0.1 g. of copper stearate and 0.1 g. of tertiary butyl pyrocatechol and the mixture was heated to 35° C. 3.3 mols of isoprene were slowly added in the course of 30 hours. After removal of the volatile components, the isomeric mixture of the formulae:

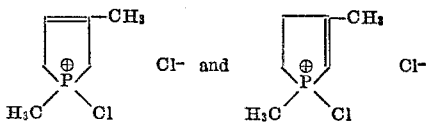

was obtained. After hydrolysis and extraction with 6× 500 ml. of chloroform, 200 g. of 1-oxo-1,3-dimethyl-phospholine were obtained.

Example 8

81 g. of isoprene were added dropwise to a mixture of 200 ml. of phosphorus oxychloride and 179 g. of phenyldichlorophosphine at 45° C. The mixture was kept at this temperature for 48 hours. The volatile components were then driven off. The compound of the following formula:

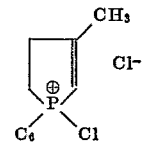

is obtained. To identify the products, the residue was hydrolysed with water, neutralised and extracted with chloroform. 75 g. (=39% of the theory) of 1-oxo-1-phenyl-3-methyl-phospholine-2 of B.P. 155° C./1 mm. Hg were obtained by distillation.

When however, for the purpose of identification of the product the residue was suspended in 150 ml. of toluene after removal of the volatile components by evaporation and hydrogen sulphide was then passed into the suspension at about 50° C. until the suspension dissolved completely, 119 g. (57% of the theory) of 1-thio-1-phenyl-3-methylphospholine-2, B.P. 173° C./1 mm. Hg, were obtained after distillation.

Example 9

450 ml. of molten methane-phosphonic acid dichloride, 273 g. of methyl-dichlorphosphine and 200 g. of butadiene as well as 1 g. of copper stearate and 1 g. of tertiary butyl pyrocatechol were mixed together and introduced into a 2 liter autoclave (consisting of nickel). The autoclave was heated 24 hours to 54–55° C. and at the end of the reaction the methane-phosphonic acid dichloride was stripped off under reduced pressure. The residue (320 g.=80% of the theory) was worked up in usual manner for characterization. Thereby 193 g. of 1-methyl-1-oxo-phospholine (71.3% of the theory) were obtained.

What we claim is:

1. Process for the preparation of unsaturated cyclic 5-membered ring phosphine dihalides which comprises reacting an organophosphorus dihalide with at least one 1,3-conjugated diene in a functionally tetravalent phosphorus solvent selected from the group of phosphorus oxyhalides, alkyl phosphonic acid dihalides and alkyl phosphinic acid halides.

2. Process as claimed in claim 1 in which the reaction is carried out in the presence of one or more polymerisation inhibitors.

3. Process as claimed in claim 1 in which the reaction is carried out at 20° C. to 90° C.

4. Process as claimed in claim 1 in which the organophosphorus dihalide is of the formula:

$$R-P(Hal)_2$$

in which

R is a substituted or unsubstituted aliphatic, cycloaliphatic, aromatic or araliphatic group, and Hal is a chlorine or bromine atom.

5. Process as claimed in claim 1 in which the diene used is of the formula:

$$CH_2=C-C=CHR_2$$
$$\phantom{CH_2=}\ \, R_1\ \ R$$

in which $R_1$, $R_2$ and $R_3$, which may be the same or different are hydrogen or chlorine atoms, alkyl radicals containing 1 to 4 carbon atoms, or phenyl groups.

6. Process as claimed in claim 1 in which the solvent used is selected from the group of phosphorus oxychloride, phosphorus oxybromide, a lower alkyl phosphonic acid dichloride or dibromide and a lower alkyl phosphinic acid chloride or bromide.

7. Process as claimed in claim 1 in which the reaction is carried out at 40° C. to 80° C.

8. Process as claimed in claim 1 carried out at superatmospheric pressure.

9. Process as claimed in claim 1 in which the ratio of solvent to the sum of reactants is 1.5 to 1 to 3 to 1.

10. Process as claimed in claim 1 in which the diene used is selected from the group of butadiene, isoprene, 2-chlorobutadiene and penta-2,4-diene.

References Cited
UNITED STATES PATENTS
2,663,736   12/1953   McCormack _____ 260—543 PX LORRAINE A. WEINBERGER, Primary Examiner R. D. KELLY, Assistant Examiner

UNITED STATES PATENT OFFICE
CERTIFICATE OF CORRECTION

PC-1050
(5/69)

Patent No. 3,751,460      Dated August 7, 1973

Inventor(s) Reinhard Schliebs and Gerhard Jonas

It is certified that error appears in the above-identified patent and that said Letters Patent are hereby corrected as shown below:

Column 1, line 40 "practical" should read --practically--

Column 4, line 39 insert --of-- before "1".

Column 6, line 44 in the formula before "$C_6$" add --$H_5$--.

Column 7, line 21 (second formula) "R" should read --$R_2$--.

Column 6, line 61, "methyl-dichlorphosphine" should read -- methyl-dichlor-phosphine --.

Signed and sealed this 26th day of March 1974.

(SEAL)
Attest:

EDWARD M. FLETCHER, JR.
Attesting Officer

C. MARSHALL DANN
Commissioner of Patents